United States Patent
Ling et al.

(10) Patent No.: US 7,198,508 B2
(45) Date of Patent: Apr. 3, 2007

(54) COMBINED ELECTRICAL CONNECTOR AND RADIATOR FOR HIGH CURRENT APPLICATIONS

(75) Inventors: Pui Tsang Peter Ling, Hong Kong SAR (CN); Yiu Sing Tong, Hong Kong SAR (CN)

(73) Assignee: Sylva Industries Ltd., Hong Kong SAR (CN)

( * ) Notice: Subject to any disclaimer, the term of this patent is extended or adjusted under 35 U.S.C. 154(b) by 0 days.

(21) Appl. No.: 11/092,605

(22) Filed: Mar. 29, 2005

(65) Prior Publication Data

US 2006/0228918 A1    Oct. 12, 2006

Related U.S. Application Data

(63) Continuation of application No. 10/369,807, filed on Feb. 21, 2003, now Pat. No. 6,929,504.

(51) Int. Cl.
  *H01R 13/00* (2006.01)
(52) U.S. Cl. ...................................................... 439/485
(58) Field of Classification Search ................. 439/33, 439/507, 485, 627; 174/99 E, 16.3; 361/690, 361/704, 707, 710, 719, 720
  See application file for complete search history.

(56) References Cited

U.S. PATENT DOCUMENTS

| | | | |
|---|---|---|---|
| 2,694,554 A | 11/1954 | Lemeshka | |
| 3,422,213 A | 1/1969 | Webb | |
| 3,831,129 A | 8/1974 | Frey | |
| RE29,513 E | 1/1978 | Johnson | |
| 4,109,096 A | 8/1978 | Dehaine | |
| 4,115,836 A | 9/1978 | Hutchison et al. | |
| 4,470,195 A | 9/1984 | Lang | |
| 4,870,308 A | 9/1989 | Sismour, Jr. | |
| 4,907,991 A | 3/1990 | Kobayashi | |
| 5,039,896 A | 8/1991 | Adams | |
| 5,087,214 A | 2/1992 | Dewar | |
| 5,136,122 A | 8/1992 | Kwitkowski et al. | |
| 5,382,480 A | 1/1995 | Molyneux | |
| 6,219,238 B1 | 4/2001 | Andros et al. | |
| 6,510,047 B2 | 1/2003 | Meiners | |

*Primary Examiner*—Phuong Dinh
(74) *Attorney, Agent, or Firm*—Buchanan Ingersoll & Rooney PC

(57) ABSTRACT

An electrical connector useful for both high-current and low-current applications including a first and a second conductive terminals, in which the terminals are interconnected by a plurality of substantially rigid and elongated conductive strips and apertures or gaps are disposed between at least some of the adjacent conductive strips. The connector provides enhanced heat dissipation characteristics and is particularly useful for high current applications such as for connecting batteries, accumulators, super-capacitors and the like storage power units for electric vehicle and other applications.

8 Claims, 5 Drawing Sheets

COMBINED ELECTRICAL CONNECTOR AND RADIATOR FOR HIGH CURRENT APPLICATIONS

This is a continuation of Application No. 10/369,807, filed Feb. 21, 2003, now U.S. Pat. No. 6,929,504.

FIELD OF THE INVENTION

The present invention relates to electrical connectors and, more particularly, to electrical connectors with enhanced heat radiating characteristics for high current applications. More specifically, although of course not solely limiting thereto, this invention relates to heat radiating electrical connectors for use in inter-cell and inter-battery electrical connections and especially in a high current environment. In addition, this invention also relates to batteries, battery groups or other storage power devices using connectors described in the following specification.

BACKGROUND OF THE INVENTION

In many electrical devices, apparatus and systems, electrical connectors are essentially used to enable circuit interconnections and therefore to provide complete electrical power circuits. In many electrical applications, for example, electric vehicles, in which a high current supply is required, electrical connectors are used to provide sufficient current by connecting a plurality of current sources together in order to fulfil the current rating demands.

During the last two decades, the development of electrical vehicles has become an important research subject since electrical power vehicles are generally considered to be more environmental friendly then fossil fuel powered vehicles. Electric vehicles are generally powered by recyclable energy sources such as storage batteries, accumulators, or "super" capacitors which can be charged after each use. In order to provide adequate power to the driving motor, an electrical power source which can supply current in the rating of several hundred amperes is generally required for an electric vehicle. For example, the electrical power source may include a number of Nickel-Metal-Hydride or Nickel Cadmium batteries connected in series. Also, in order to provide adequate voltage level and current rating, battery cells or groups of batteries are generally interconnected by connectors having a low internal resistance.

The batteries, power capacitors, super-capacitors, accumulator cells, groups of batteries, accumulators or super-capacitors, are generally connected together by conductive metallic members made, for example, of copper, copper alloys, aluminium, aluminium alloys, nickel, nickel alloys, mild steel and like materials, in order to provide the necessary electrical power. For example, a common accumulator is formed by connecting a plurality of accumulator cells in parallel and/or in series and a corresponding number of electrical connectors are required to connect adjacent cells to form the accumulator.

The connectors are generally in the form of a metallic bar with a first and a second terminal ends and having a uniform thickness or cross-section between the terminals. The cross-sectional areas of the connectors are generally designed according to established rules of electrical engineering by reference to the rated current so that a rated current can flow through the connector continuously without generating excessive resistive heat.

The heat is generally due to the internal resistance of the connector and is generally proportional to the square of the current multiplied by the internal resistance. Since it is known that the internal resistance of a conductor is generally inversely proportional to its cross-sectional area for a given conductor, the use of conductors having a large cross-sectional area as connectors for high current applications to minimise heat dissipation would appear to be a natural solution. However, larger cross-sectional area means heavier and more costly connectors which are undesirable or even un-acceptable for many applications.

Furthermore, since good electrical connectors are usually also good thermal connectors, heat generated from other parts of the electric circuits, for example, from inside the battery or accumulator cells, will also be conducted to the connectors. Thus, the ability to dissipate unwanted heat becomes an important criteria for determining the performance of an electrical connector for high-current applications.

As mentioned earlier on, one of the typical connectors for high current applications includes a rigid metal bar having a first and a second terminal ends for connecting to the relevant electrical terminals. In fact, this type of rigid bar connectors is almost a standard choice for inter-battery cell connections. To mitigate fire and other hazards, it is always desirable to maintain the connectors below a safe temperature. Furthermore, excessive temperature will cause the rigid connector bar to expand which may cause distortion, or even damage, to the terminals or other components being connected.

Thus, it is desirable to provide an improved electrical connector which can be used in high-current as well as low-current applications and which will alleviate the heat dissipation problems associated with conventional electrical connectors. On the other hand, since a large number of connectors are usually used together in order to provide sufficient electrical power, the weight and cost of individual connector must be minimised since their adverse effects will be cumulative.

Hence, it will be advantageous if the improved connectors can substantially alleviate the short-comings associated with conventional high-current connectors while at the same time fulfilling the general requirements of being low in cost and weight, or at least, comparable to the cost and weight of conventional connectors.

It will be more advantageous if the improved connectors substantially fulfil the afore-said requirements and, at the same time, have a relatively compact and simple structure which at the same time provide improved heat dissipation characteristics and to slow down the building up of undesirable heat. In other words, it is advantageous to provide an improved electrical connector which is simple and has enhanced heat sinking, heat radiation or heat dissipation characteristics.

In view of the afore-said short-comings of conventional electrical connectors, it will be appreciated that there is a long-awaited and continuous need of improved electrical connectors which alleviate the short-comings associated with conventional connectors while generally fulfilling the afore-said requirements. In this regard, it is therefore desirable that the heat dissipation characteristics of an electrical connector of a certain cross-sectional area can be enhanced so that an improved electrical connector can be provided with no, or only minimal additional weight and cost overheads.

OBJECT OF THE INVENTION

In view of the afore-said, it is therefore an object of the present invention to provide improved electrical connectors which have improved heat dissipation characteristics to slow down the building up of adverse heat while at the same time with minimal, insignificant, or even nil additional costs, weight or volume overheads. Put simply, it is an object of the present invention to provide improved electrical connectors with a simple structure which can be made at a low cost and by simple methods and at the same time proffers improved heat dissipation or temperature characteristics. As a minimum, it is an object of the present invention to provide the public with a choice of improved electrical connectors which can be used in high-current applications.

SUMMARY OF THE INVENTION

According to the present invention, there is provided an electrical connector including a first and a second conductive terminals, wherein said terminals are interconnected by a plurality of substantially rigid and elongated conductive strips, wherein apertures are disposed between at least some of the adjacent conductive strips.

According to another aspect of the present invention, there is provided an electrical power storage unit including cells which are connected by a plurality of connectors, wherein said conductor including a first and a second conductive terminals, wherein said terminals are interconnected by a plurality of substantially rigid and elongated conductive strips, wherein apertures are disposed between at least some of the adjacent conductive strips.

Preferably, at least some of the adjacent elongated conductive strips are separated by elongated apertures which are generally parallel to the line joining said terminals.

Preferably, at least some of said elongated conductive strips are generally parallel to the line joining said terminals.

Preferably, at least some of said elongated conductive strips has an arcuate shape formed between the two said terminals.

Preferably, the aperture are substantially elongated and extending between said terminals and separating elongated conductive strips.

Preferably, the terminals and said elongated conductive strips are integrally formed from a single conductive member.

Preferably, at least some of said conductive strips are separated in a direction orthogonal to the line joining said terminals.

Preferably, the connector is for connection to an electric power storage device such as accumulators, batteries or power capacitors.

Preferably, some of said elongated conductive strips form an arc between said terminals and adjacent elongated conductive strips form arcs of different curvatures.

Preferably, the connector is made of copper, copper alloys, aluminium, aluminium alloys, nickel, nickel alloys, mild steel and the like materials.

Preferably, at least some of said elongated apertures are substantially parallel to the line joining said terminals.

Preferably, at least one of the longitudinal sides of said elongated aperture has a curved boundary.

Preferably, the elongated aperture is formed by separating a plurality of said elongated conductive strips from an integral piece of a conductive member.

Preferably, the curved boundary of said aperture forms a convex curve away from the line joining said terminals.

Preferably, the boundary is elevated above the adjacent conductive strip.

Preferably, an additional aperture which is substantially orthogonal to said aperture is formed between at least some of the adjacent elongated conductive strips.

In the above connection, the power storage unit preferably includes cells of a battery, an accumulator, a capacitor or a super-capacitor, connected together.

BRIEF DESCRIPTION OF THE DRAWINGS

Preferred embodiments of the present invention will be explained in further detail by way of examples and with reference to the accompanying drawings, in which.

DETAILED DESCRIPTION OF THE PREFERRED EMBODIMENT

Figure 1:
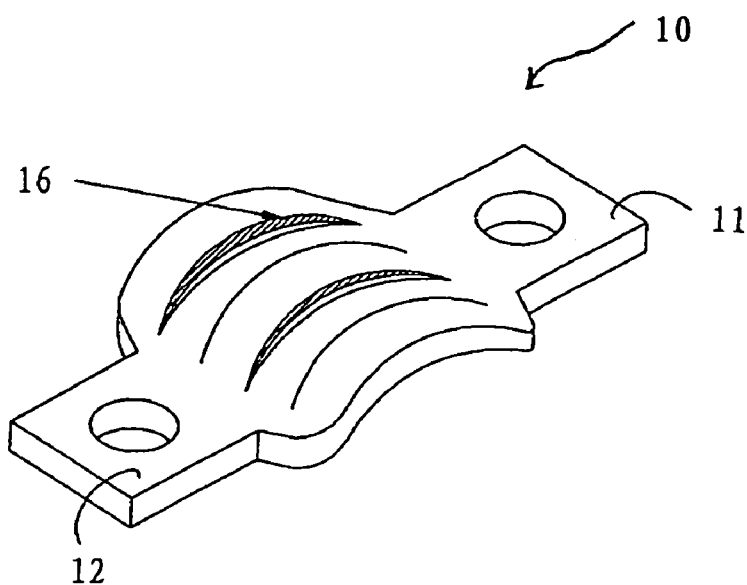
FIG. 1 is a drawing showing a perspective view of a first preferred embodiment of the improved electrical connector of the present invention.
Figure 2:
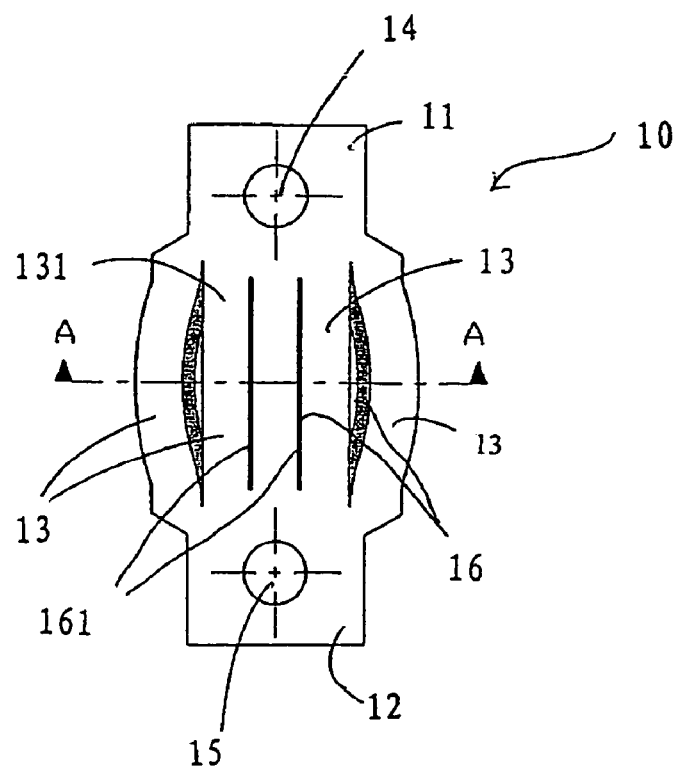
FIG. 2 shows the top plan view of the connector of FIG. 1.
Figure 3:
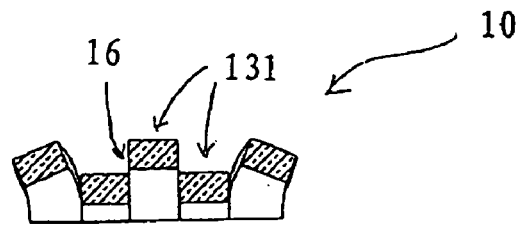
FIG. 3 is a cross-sectional view of the connector of FIG. 2 taken along the line A—A.
Figure 4:
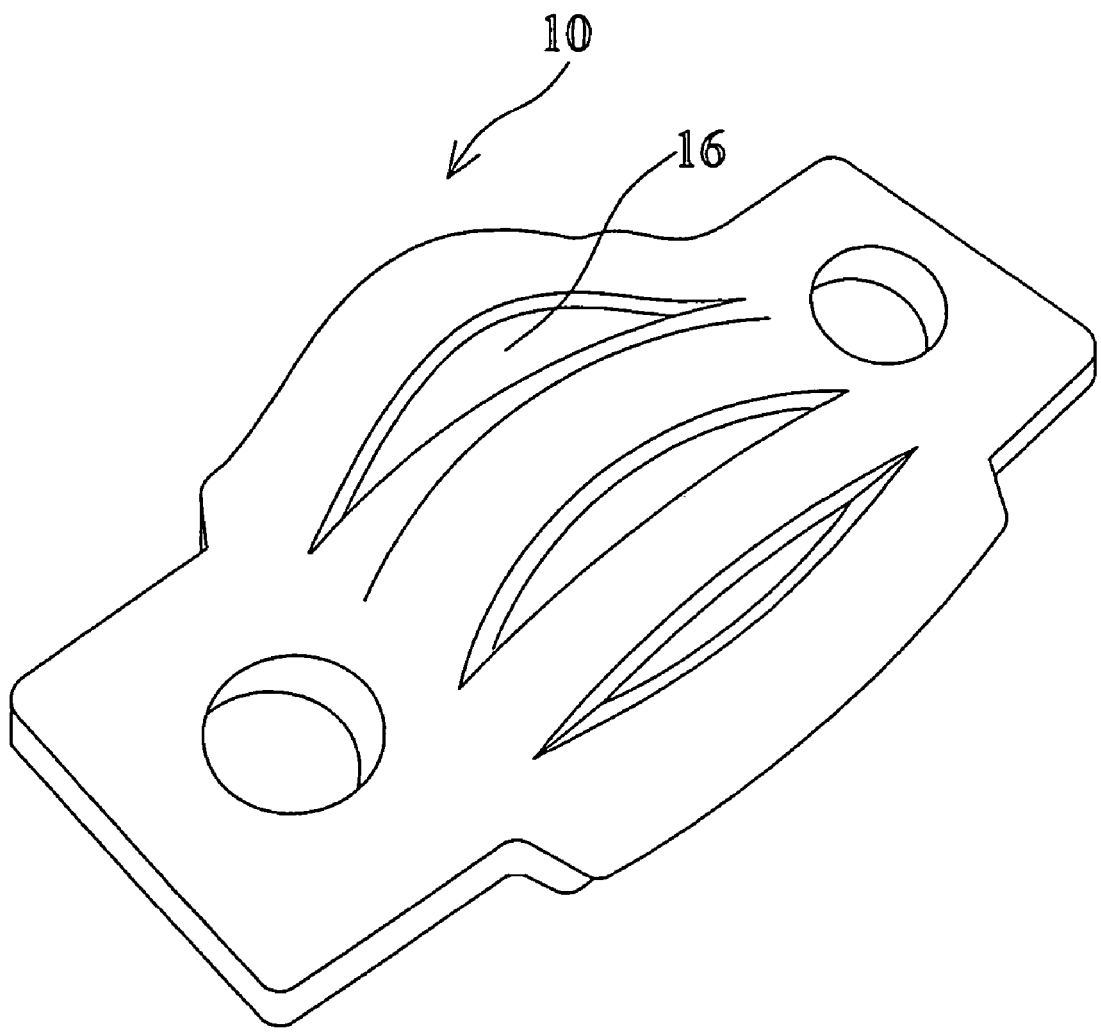
FIG. 4 is a line drawing of the preferred connector of FIG. 1.

Referring firstly to FIGS. 1–4, there is shown a first preferred embodiment of an improved electrical connector (10) of the present invention. The connector includes a first (11) and a second (12) conductive terminals which are interconnected by a plurality of elongated conductive strips (13) as shown in FIGS. 2 and 3. At least a plurality of the elongated conductive strips (13) are substantially parallel to the general direction of current flow which is generally the same as the line joining the two terminals (11, 12). An aperture (14, 15) or air-gap is formed on each of the connector terminals for fastening to corresponding terminals of the adjacent electric circuit or, in the case of accumulators, adjacent cells. The generally parallel elongated conductive strips are separated by elongate air slots, aperture, or air gaps (16, 161).

At least some of the air slots or gaps (161) are also generally parallel to the line joining the two terminals. The elongated air gaps or slots (16, 161) provide addition ventilating or heat sinking surfaces along the conductive path by providing additional surface area for contact with the surrounding cooling air. In order to further enhance the ventilating or heat sinking efficiency for effectiveness of the conductive strips (13), some of the elongated conductive strips further have at least a portion which is elevated above the planes of the terminals as shown in FIG. 2 and the cross-sectional view of FIG. 3.

Referring to FIG. 3, it will be appreciated that some of the conductive strips are arranged in a manner such that alternate conductive strips are disposed at different elevation levels. Such an arrangement further enhances the heat dissipation efficiency since the adjacent side surfaces of the individual conductive strips are no longer directly opposing each other and separated by a small gap which only allows a small volume of air to flow through. Instead, with the alternating elevated strips structure and arrangement, the volume of the air space separating the directly opposing side surfaces are significantly increased, thereby providing additional volume of cooling air and enhancing heat dissipation efficiency.

To even further enhance heat dissipation efficiency, possible additional air gap separation is provided by increasing the space gap separation between the adjacent conductive strips. For example, the outermost conductive strips are pushed or bent outwards near its middle portion so that the air gap formed between the outermost conductive strip and its adjacent strip b as an arcuate shape, resulting in a general increase in the separating space. In this preferred embodiment, it will be observed that the outermost conductive strips are arcuate upwards as well as sideways so that one of its air-gap defining edge is also substantially arcuate or convex away transversally from the adjacent conductive strip. While only the outermost conductive strips are bent outwards in this particularly embodiment, it will be appreciated that some of the conductive strips disposed between the two outermost conductive strips can also be made arcuate in the transversal direction so that the transversal curvature of the conductive strips gradually increase from the innermost to the outermost conductive strips.

Figure 5:
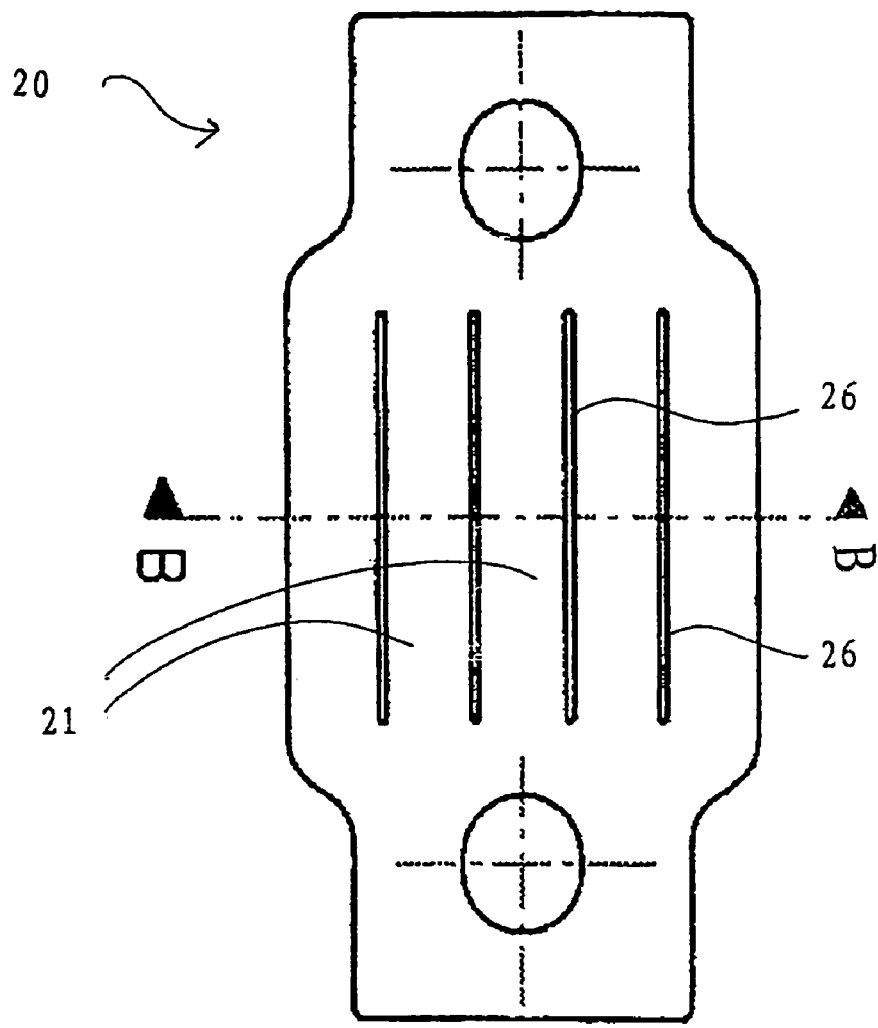
FIG. 5 is a top plan view of a second preferred embodiment of the improved connector of the present invention.
Figure 6:
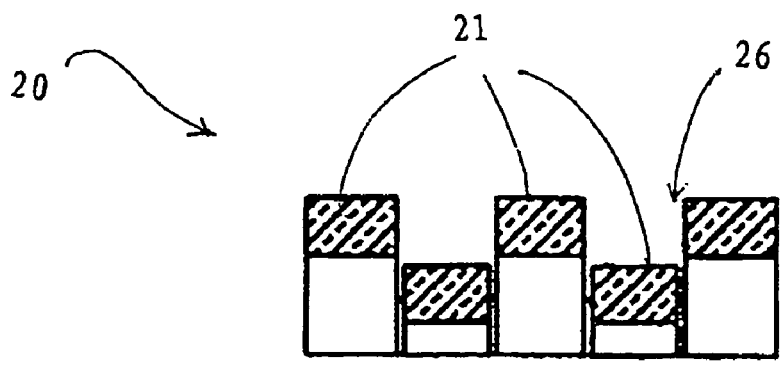
FIG. 6 is a cross sectional view of the connector of FIG. 5 taken along the line B—B.

In the second preferred embodiment as shown in FIGS. 5 and 6, the connector (20) includes elongated conductive strips (21) separated by elongated air gaps. The air gaps are substantially parallel to the conductive strips. The elongated strips are formed so that substantial portions of the alternate strips (21) are elevated at different levels. The conductive strips can be made arcuate along its length or simple made to elevate at some portions.

Figure 7:
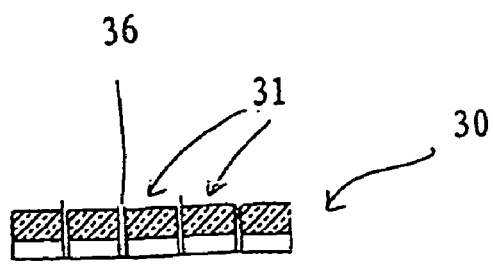
FIG. 7 is a cross-sectional view of the connector of a third preferred embodiment of the present invention.

In the third embodiment as shown by the cross-sectional view of FIG. 7, the connector (30) include a plurality of conductive strips (31), which are substantially the same as that of the second embodiment, except that the strips are arranged at substantially the same vertical elevation. In this embodiment, the conductive strips are separated by parallel air slots.

Figure 8:
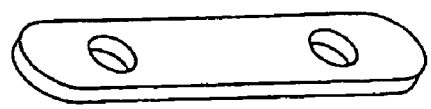
FIG. 8 shows a first example of a conductive member which can be used as a starting material to prepare a connector of the present invention.
Figure 9:
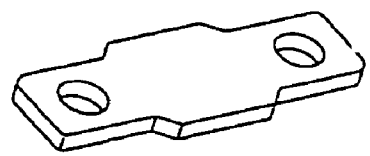
FIG. 9 shows a second embodiment of a conductive member which can be used as a starting material for making a connector of the present invention.
Figure 10:
FIG. 10 shows a third example of a conductive member which can be used to make a connector of the present invention.
Figure 11:
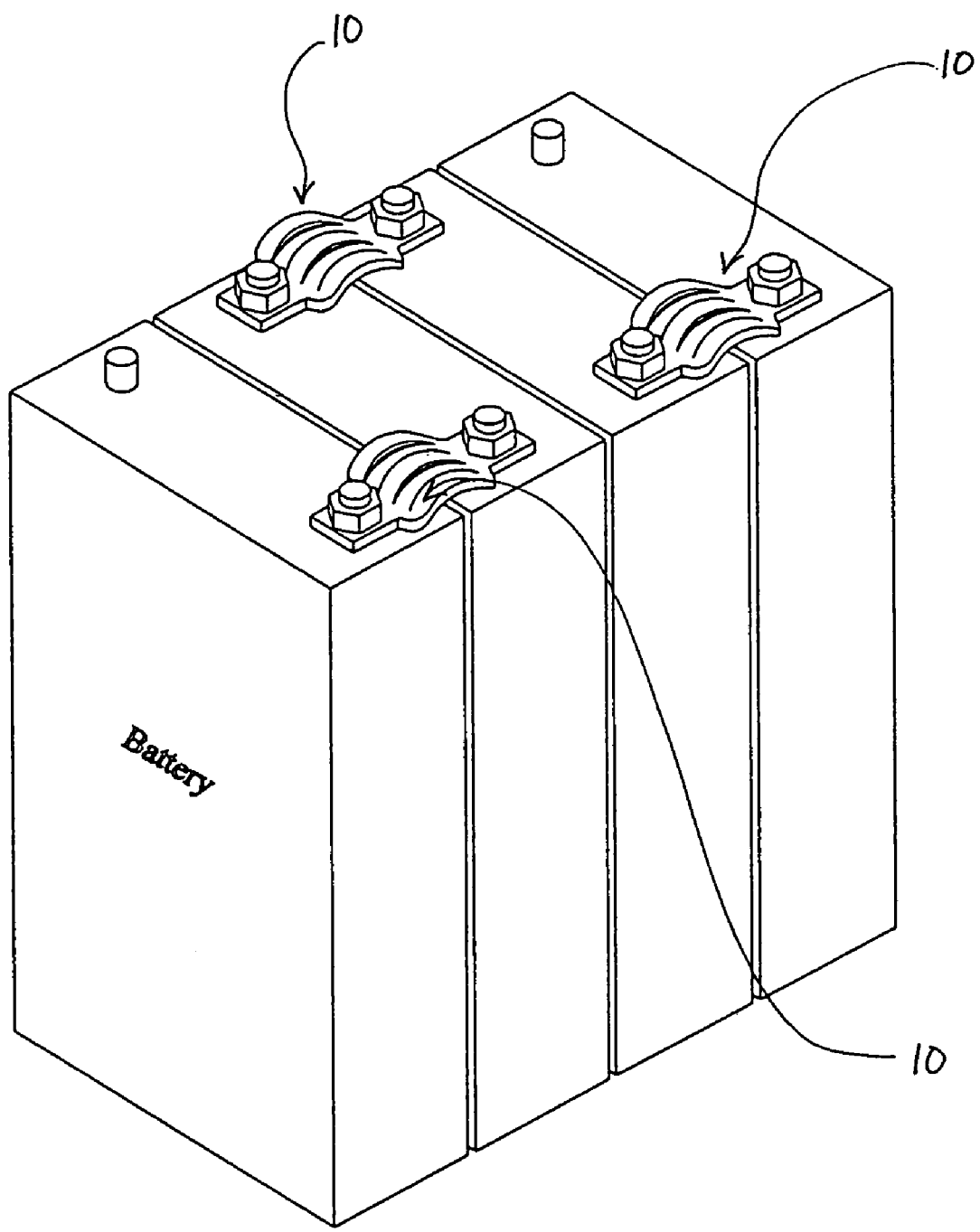
FIG. 11 is a figure showing a power storage device including a plurality of connectors of a first preferred embodiment of the present invention.

Turning now to the making of the preferred connectors. The improved electrical connectors can be made from a metal element of a uniform thickness across its length. Examples of suitable shapes of a conductive member which can be used are shown in FIGS. 8 to 10. In order to provide low internal resistance for current conduction, the conductive members are preferably made of copper, copper alloys or other suitable conductive material. Of course, the conductive member can also be coated with Nickel, Chromium or other surface coating agents to improve its appearance or durability. Firstly, a piece of suitable conductive member is placed in a hydraulic press or other suitable machines so that the conductive member is blanked to form the elongated air gaps. The conductive members are then treated to form arcuate conductive strips and at least some portions of the adjacent conductive strips are made with different vertical elevations. Next, the outermost, or other conductive strips, are pushed outwards so that they are convex outwards to further increase the general air gap distance.

While the above steps have been explained as separate steps, they can of course be completed in a single step by a suitably designed mould or tooling. Also, while the above straps are for making a connector of the first preferred embodiment, the other embodiments can be made with suitable adjustment or adaptation by skilled persons without loss of generality.

It will be appreciated that the afore-mentioned electrical connectors can be made, for example, of cooper, copper alloys, aluminium, aluminium alloys, nickel, nickel alloys, mild steel and the like materials, in order to provide the necessary electrical power. Also, the electrical connectors can be used in high current applications for connecting batteries, accumulators, power capacitors, super-capacitors or other high- and low-current devices and systems.

Furthermore, while the present invention has been explained by reference to the preferred embodiments described above, it will be appreciated that other trivial modifications or variations of the designs are possible by adapting the principles, concepts or ideas of the invention described herein without deviating from the scope and spirit of the present invention. The preferred embodiments are only provided to illustrate some of the possible examples and variations of the present invention, it will be appreciated that the present invention can be realised in other ways or by other methods in light of common general knowledge without loss of generality.

The invention claimed is:

1. An electrical connector for current conduction comprising first and second spaced-apart contact terminals for making electrical and mechanical connection with external electrical devices, and a plurality of spaced apart elongated conductive members interconnecting said first and second contact terminals; wherein said plurality of elongated conductive members and said first and second contact terminals are integrally formed from a single piece of a rigid current conductor, and said plurality of elongated conductive members are spaced apart and function to sink and radiate heat from at least one of said external electrical devices; wherein said plurality of elongated conductive members respectively form a plurality of arcuate bridges extending above the space between said contact terminals, the curvature of an adjacent pair of elongated conductive members being different so that an immediately adjacent pair of elongated conductive members are vertically spaced in a manner that is non-constant along the length of said pair of elongated conductive members and are transversely spaced in a manner that gradually increases and then gradually decreases along the length of said elongated conductive members, and wherein the elongated conductive members on outside edges of said connector curve away from the longitudinal axis of said connector.

2. An electrical connector for current conduction comprising first and second spaced-apart contact terminals for making electrical and mechanical connection with external electrical devices, and a plurality of spaced apart elongated conductive members interconnecting said first and second contact terminals; wherein said plurality of elongated conductive members and said first and second contact terminals are integrally formed from a single piece of a rigid current conductor, and said plurality of elongated conductive members are spaced apart and function to sink and radiate heat from at least one of said external electrical devices; and wherein said plurality of elongated conductive members respectively form a plurality of arcuate bridges extending above the space between said contact terminals, the curvature of an adjacent pair of elongated conductive members being different so that an immediately adjacent pair of elongated conductive members are vertically spaced in a manner that is non-constant along the length of said pair of elongated conductive members and are transversely spaced in a manner that gradually increases and then gradually decreases alone the length of said elongated conductive members.

3. An electrical connector according to claim 2, wherein said contact terminals further comprise connection means for making thermal and electrical contacts with an electrical device.

4. An electrical connector for current conduction comprising first and second spaced-apart contact terminals for making electrical and mechanical connection with external electrical devices, and a plurality of spaced apart elongated conductive members interconnecting said first and second contact terminals; wherein said plurality of elongated conductive members and said first and second contact terminals are integrally formed from a single piece of a rigid current conductor, and said plurality of elongated conductive members are spaced apart and function to sink and radiate heat from at least one of said external electrical devices; wherein said plurality of elongated conductive members respectively form a plurality of arcuate bridges extending above the space between said contact terminals so that the length of the heat radiating elongated conductive members exceeds the separation between said contact terminals, and wherein the curvature of an adjacent pair of elongated conductive members is different so that an immediately adjacent pair of elongated conductive members are vertically spaced in a manner that is non-constant along the length of said pair of elongated conductive members.

5. An electrical connector according to claim 4, wherein the vertical spacing between an adjacent pair of elongated conductive members is maximum at around a middle portion of an elongated conductive member.

6. An electrical connector for current conduction comprising first and second spaced-apart contact terminals for making electrical and mechanical connection with external electrical devices, and a plurality of spaced apart elongated conductive members that form a plurality of arcuate bridges interconnecting said first and second contact terminals and extending above the space between said contact terminals so that the length of the elongated conductive members exceeds the separation between said contact terminals; wherein said plurality of elongated conductive members and said first and second contact terminals are integrally formed from a single piece of a rigid current conductor, and said plurality of elongated conductive members are spaced apart such that an adjacent pair of elongated conductive members are transversally spaced in a manner that gradually increases and then gradually decreases along the length of said elongated conductive members, and are vertically spaced in a manner that gradually increases and then gradually decreases alone the length of said elongated conductive members; and function to sink and radiate heat from at least one of said external electrical devices.

7. An electrical connector according to claim 6, wherein the elongated conductive members on outside edges of said connector curve away from the longitudinal axis of said connector.

8. An electrical connector according to claim 6, wherein said elongated conductive members and said contact terminals are of substantially the same thickness.

* * * * *